United States Patent [19]

Tansey

[11] Patent Number: 4,575,247
[45] Date of Patent: Mar. 11, 1986

[54] PHASE-MEASURING INTERFEROMETER

[75] Inventor: Richard J. Tansey, Thousand Oaks, Calif.

[73] Assignee: Rockwell International Corporation, El Segundo, Calif.

[21] Appl. No.: 627,363

[22] Filed: Jul. 2, 1984

[51] Int. Cl.$^4$ .............................................. G01B 9/02
[52] U.S. Cl. ................................... 356/349; 356/354; 356/359
[58] Field of Search ............... 356/349, 351, 354, 355, 356/356, 359, 360

[56] References Cited

U.S. PATENT DOCUMENTS 4,387,966  6/1983  Holly .................................. 356/360

OTHER PUBLICATIONS

Smartt et al., "Theory and Application of Point-Diffraction Interferometers", *Proc. ICO Conf. Opt. Methods in Sci. and Ind. Meas.* Tokyo, pp. 351–356, 1974.
Koliopoulos et al., "Infrared Point-Diffraction Interferometer", *Optics Letters,* vol. 3, pp. 118–120, Sep. 1978.

*Primary Examiner*—Davis L. Willis
*Assistant Examiner*—Matthew W. Koren
*Attorney, Agent, or Firm*—H. Fredrick Hamann; Harry B. Field

[57] ABSTRACT

A heterodyne phase-determining interferometer comprising a Smartt point diffraction interferometer (PDI) 10 in which the pinhole plate 22 is replaced by a half-wave, partially transmitting plate 22' with a pinhole 20 therein. The output beams 26 and 24 from the pinhole 20 are propagated through a frequency shifter 12 which includes a quarter-wave plate 28 whose axis is at 45° to the polarization axes of the two beams 26 and 24 coming from the PDI 10, a half-wave plate 30 rotating at an angular frequency of ω, and a linear polarizer which orients the polarization vectors of the two beams in the same direction along the propagation axis. The output of the frequency shifter 12 is a moving interference pattern consisting of alternate light and dark lines. This pattern is projected upon a phase-measuring means 14 comprising an array of photodetectors 34, 36 connected to a plurality of phase-to-voltage converters 38. There is one reference photodetector 34, the rest being test photodetectors. The reference photodetector 34 is connected to all phase-to-voltage converters 38, but each test photodetector 36 is connected to a different phase-to-voltage converter 38. The output of each converter 38 is the phase difference between the light at the point viewed by its associated test photodetector 36 and the light at the point viewed by the reference photodetector 34.

7 Claims, 4 Drawing Figures

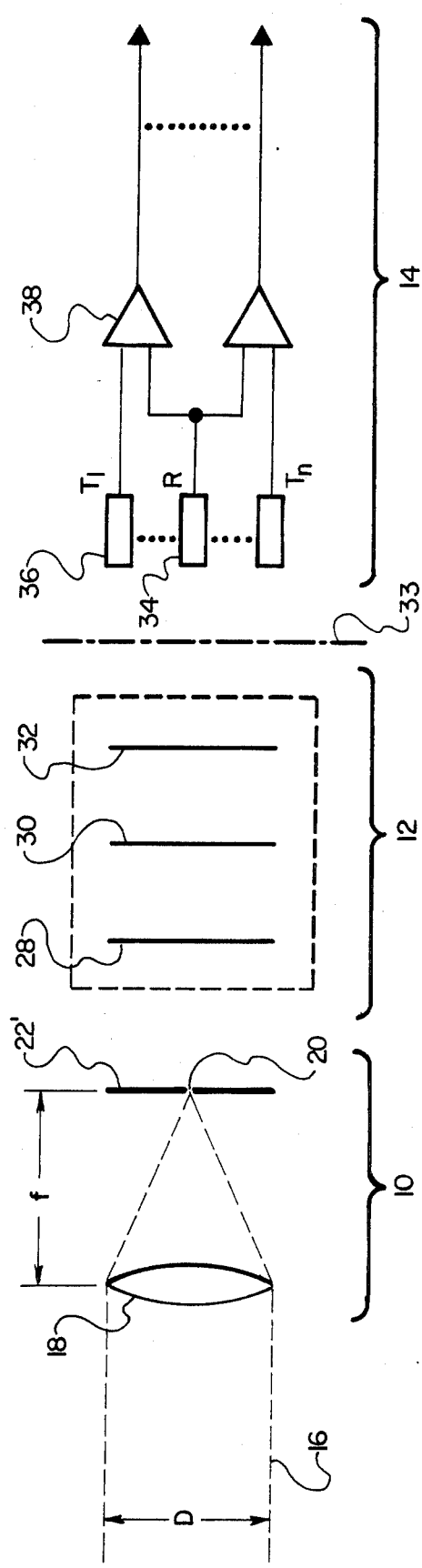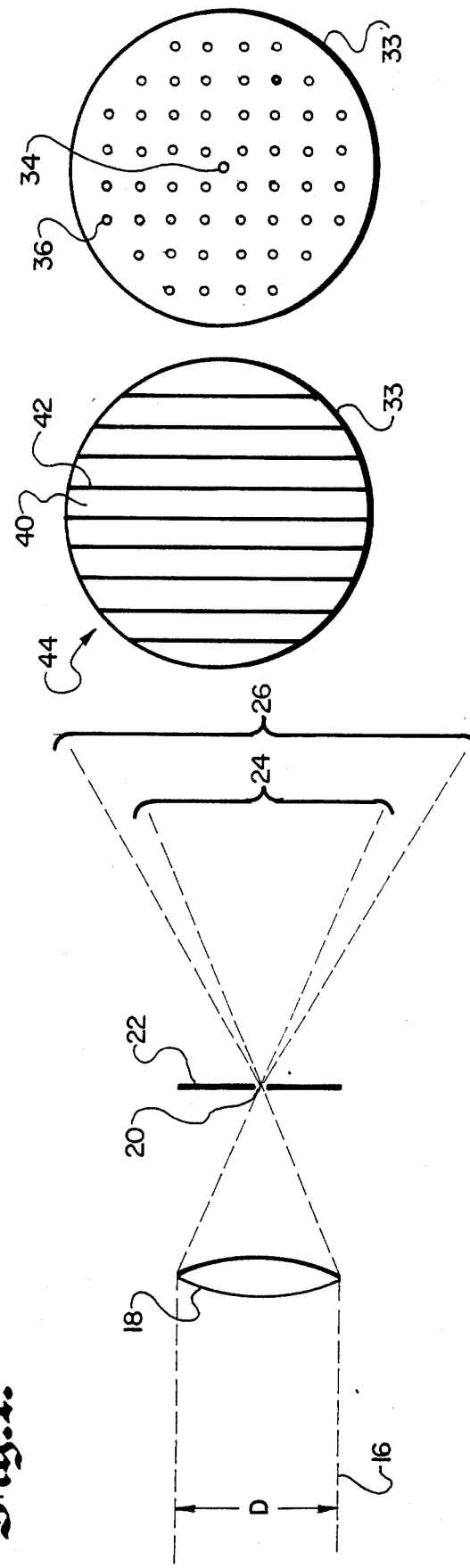
Fig. 1.
Fig. 2.
Fig. 3.
Fig. 4.

PHASE-MEASURING INTERFEROMETER

BACKGROUND OF THE INVENTION

1. Field of the Invention

This invention relates to interferometers and especially to a heterodyne, phase-measuring interferometer (HPMI).

2. Description of the Prior Art

Phase uniformity of a laser beam across a flat plane which is transverse to its propagation direction or axis is important because it is difficult to focus beams which have a non-uniform transverse phase profile. Apparatus commonly used for phase analysis of a wavefront requires a lateral or shear interferometer to convert slope data into phase data or a superheterodyne technique which compares the phase of a local oscillator (laser) to the test beam wavefront. The first apparatus requires complicated and time-consuming solutions of simultaneous equations or an analog network of resistors to obtain phase data from the slope data. The second apparatus requires the phase-locking of two lasers which is very difficult to accomplish, especially in non-laboratory conditions.

OBJECTS OF THE INVENTION

An object of this invention is to obtain information that indicates the phases of a light beam at individual points in the beam in a plane perpendicular to the beam axis, i.e., to obtain information indicating the transverse phase profile of the light beam.

Another object is to obtain the phase information by means of relatively simple, easy-to-use apparatus.

Other objects, advantages and novel features of the present invention will become apparent from the following detailed description of the invention when considered in conjunction with the accompanying drawing.

SUMMARY OF THE INVENTION

This invention comprises a modified, point diffraction interferometer for separating an incoming light beam, especially a laser beam, into two orthogonally polarized components. The two components are then propagated through a frequency shifter having a rotating half-wave plate which provides a pair of output beams which differ in frequency by four times the angular frequency of the plate. The polarization vectors of the two beams from the frequency shifter are in line with the beam axis and the two beams produce an interference pattern consisting of alternating light and dark lines which travel in one direction. Phase-detection apparatus is then used to analyze the interference pattern at a multiplicity of points to determine the difference of phase at each point from the phase at a reference point in the pattern. These values of phase difference are transformed into an electrical parameter, such as voltage, and can be used to activate a phase-correction device, such as a deformable mirror, to correct (i.e., null) the phase differences. The HPMI is a phase-difference measuring device for obtaining phase differences existing in the wavefront of a light beam. It intrinsically generates a reference beam from the incoming test beam without the use of a local oscillator or external reference beam.

BRIEF DESCRIPTION OF THE FIGURES

FIG. 1 is a schematic diagram of an embodiment of the invention.

FIG. 2 is a schematic diagram of a Smartt point diffraction interferometer.

FIG. 3 is a schematic diagram showing the interference pattern of the output of the frequency shifter of the embodiment of FIG. 1.

FIG. 4 is a schematic diagram of a possible array pattern for the test and reference photodetectors.

The same elements or parts through the figures of the drawing are designated by the same reference characters, while equivalent elements bear a prime designation.

DETAILED DESCRIPTION OF THE PREFERRED EMBODIMENTS

An embodiment of the present invention is illustrated in schematic form in FIG. 1. The invention comprises a modified Smartt interferometer 10 which feeds its output through a frequency shifter 12. The wavefront of the output beam of the frequency shifter 12, which is a traveling interference pattern, is analyzed at a multiplicity of points in a plane transverse to the beam axis by a phase-detection system 14.

A schematic diagram of a Smartt, or point diffraction interferometer (PDI) 10 is shown in FIG. 2. The PDI 10 uses a lens 18 to focus an incoming test beam, or test wavefront 16, onto a pinhole 20 centrally located in a partially transmitting substrate. The pinhole diameter $d = 1.2 \, f\lambda/D$ where f is the distance from the center of the lens to the pinhole, $\lambda$ is the wavelength of the incoming light beam and D is the diameter of the incoming light beam. The pinhole 20 must be sufficiently small (approximately one-half of the diameter of the Airy Disc or less) that a spherical wave 26 is formed by diffraction. The diffracted beam 26 serves as a reference beam and interferes with the directly transmitted test beam 24. The resultant interference pattern is a direct measure of the test wavefront 24 and has the same characteristics as interference patterns of a Twyman-Green or Mach-Zender interferemeter.

In order to obtain polarization vectors for the diffracted and directly transmitted components 26 and 24, respectively;, of the output beam of the PDI 10, the Smartt PDI 10 is modified by making the pinhole plate 22' $n\lambda/2$ thick (where n=integer). This is known as a half-wave plate and introduces a phase difference of 180°, or $\pi$ radians, between the ordinary (o) and extraordinary ray (e). If the plane of vibration of the incoming beam of linear light makes an angle of $\theta$ with the optic axis of the plate 22', or when it emerges from the plate, there will be a phase shift of $\lambda/2$ (or $2\pi/2$ radians) with the result that the polarization vector E will have rotated by $2\theta$.

The beam is now directed through a frequency shifter 12. The beam first goes through a quarter-wave plate 28, then through a half-wave, rotating plate 30, and finally through a linear polarizer 32, such as a sheet of Polaroid material or polarizing beam splitter oriented at 45°. The quarter-wave plate 28 is oriented with its axis at 45° to the beam axis and the linear polarizer 32 is oriented so that its axis is parallel with the beam axis. The rotating plate 30 rotates at an angular velocity of $\omega$. An incident wavefront consisting of two beams of angular frequency $\omega_o$, linearly polarized orthogonally, when passing through the frequency shifter 12, will be formed into two beams linearly polarized in the direction of the beam axis having frequencies of $\omega_o + 2\omega$ and $\omega_o - 2\omega$. If the two incident orthogonal beams to the frequency shifter 12 represent the test and reference wavefronts of an interferometer, then the output of the device will vary sinusoidally with time, the irradiance at the observation phase given by:

$$I = 1 + A \sin(4\omega t + \phi) \quad (1)$$

where A is the amplitude of the sinusoidal wave and $\phi$ is its phase with respect to the reference beam.

The mathematics for the frequency shifter 12 is as follows:
Using Jones calculus:
The initial polarization state is $$\vec{\epsilon_i} = e^{i\omega_o t} \left[ \begin{vmatrix} 1 \\ 0 \end{vmatrix} + \begin{vmatrix} 0 \\ 1 \end{vmatrix} \right] \quad (2)$$

where $\omega_o$ is the angular frequency of the incident reference and test waves.

The final polarization state is the matrix product $$\vec{\epsilon_F} = M_3 M_2 M_1 \vec{\epsilon_i} \quad (3)$$

where $M_3$ represents the analyzer, $M_2$ the rotating half-wave plate, and $M_1$ the quarter wave plate at 45°.

Using the standard form for these matrices as given in any optics text.

$$M_3 = \begin{vmatrix} 1 & 0 \\ 0 & 1 \end{vmatrix} \quad (4)$$

$$M_2 = -1 \begin{vmatrix} \cos 2wt & \sin 2wt \\ \sin 2wt & -\cos 1 wt \end{vmatrix} \quad (5)$$

$$M_1 = \frac{e^{i\pi/4}}{2} \begin{vmatrix} 1+i & 1-i \\ 1-i & 1+i \end{vmatrix} \quad (6)$$

Using (4), (5) and (6) in (3) and performing the matrix multiplication results in:

$$\vec{\epsilon_f} = \frac{+1 e^{i2wt}}{\sqrt{2}} \begin{vmatrix} 1 \\ 0 \end{vmatrix} \frac{-1}{\sqrt{2}} e^{-i2wt} \begin{vmatrix} 1 \\ 0 \end{vmatrix} \quad (7)$$

Equation (7) represents a wave with two interfering beams polarized along x and which differ in optical frequency by $4\omega t$. The irradiance at the observation plane will be given by $$I = \vec{\epsilon_f}^* \vec{\epsilon_f} \quad (8)$$

and is proportional to $$I \propto 1 + \cos(4\omega t + \phi) \quad (9)$$

where $\phi$ is the phase of the test wavefront as compared to the reference.

The output from the frequency shifter 12, if projected upon a viewing screen 33, would appear as shown in FIG. 3, a series of alternating light and dark bands 40 and 42 which move to the right or to the left. The viewing screen 33 is not an actual component in the apparatus but has been mentioned here only for explantory purposes.

This moving interference pattern 44 is applied to a phase-detection system, or means, 14. The phase-detection system 14 may, for example, comprise a multiplicity of photodetectors, one of which is designated the reference detector 34 and the rest of which are designated the test detectors 36. The reference detector 34 may be placed anywhere in the transverse beam pattern 33, although the center of the pattern may be preferable. The rest of the detectors, the test detectors 36, are formed into an array around the reference detector 34. If a deformable mirror is the final device to which the phase-detection system outputs are applied to correct phase distortions in the input beam to the present invention, then the number of test detectors 36 and the pattern of the array would be equal to the number of movable actuators and the pattern of the array would conform to the locations of the movable actuators of the deformable mirror (not shown). The output of each test detector 36 and the output of the reference detector 34 are a function of phase $\phi$ (see equation (1)). Each pair of these outputs are applied to a different phase-to-voltage converter 38, the output of which is a voltage whose amplitude is proportional to the phase difference between the two applied inputs. Phase-to-voltage converters are well known in the electronics field. One type, a so-called zero-crossing phase detector, determines the period lengths of the test and reference cosine waves, which travel past a test and reference detector, by marking the zero crossing points of the waves. The period-length difference between test and reference waves is directly proportional to the phase difference between the waves and this is converted to a voltage. This phase-related voltage is applied to the actuator of the movable actuator of the deformable mirror with which the test detector is related in orientation and the position of the movable mirror attached to the actuator is adjusted to null the phase difference. Any other suitable phase-detection system providing outputs proportional to the phase of the output beam from the frequency shifter 12 may be employed.

Mechanical rotation of the half-wave plate at a rate of 30,000 RPM provides a frequency shift of 2 KHz. Faster frequency shifting would require the use of electronic modulation to simulate the rotation of the half-wave plate.

What has been described immediately above is a typical application of a HPMI in adjusting the transverse phase profile of a beam of light, such as a laser beam, by means of the HPMI and a deformable, or segmented, mirror. The HPMI phase outputs could also be fed to a computer to provide a two-dimensional phase plot, if desired.

The HPMI's unique attributes and advantages include:

1. Insensitivity to vibration since the reference and test beams are equally affected.
2. A beam splitter or hole grating can be used to obtain the wavefront which is to be tested.
3. Use of a stationary half-wave plate results in a stationary fringe pattern which can be employed for visual observation and alignment.
4. A deformable or segmented mirror or other wavefront correction device can obtain direct phase measurements without conversion of slope data and without the need for a local oscillator.
5. The HPMI can be used to test large-aperture telescopes with the phase information converted to a two-dimensional plot of optical path length.

6. Any techniques employing a phase sensor can be accomplished by means of the HPMI and direct (rather than calculated) phase is obtained.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A phase-determining interferometer for determining the phases at different points in the wavefront of an incoming test beam of light comprising:

point diffraction interferometer (PDI) means for forming a directly transmitted and a diffracted beam whose polarization vectors are orthogonal to each other, said PDI means having a focusing means and a half-wave, partially transmitting plate with a pinhole therein, the diameter of the pinhole being small enough to form a spherical unaberrated reference wavefront from the light focussed on the pinhole;

frequency-shifting means for converting said orthogonal beams from the interferometer into two beams differing in frequency from each other and forming a moving interference pattern therefrom in a plane transverse to the beam propagation axis; and means for converting the irradiance at specific points in the output beam pattern of the frequency-shifting means into proportionate phase-indicating data.

2. An interferometer as in claim 1, wherein:

said frequency-shifting means includes means for imposing a sinusoidal frequency of $2\omega$ upon the two orthogonal beams received by the frequency-shifting means, whereby the frequencies of the two beams are displaced from their original frequency.

3. An interferometer as in claim 2, wherein:

said frequency-shifting means includes means for shifting the polarization vectors of the two frequency-shifted beams so that both lie along the same axis in the same direction and the beams provide a moving interference pattern.

4. An interferometer as in claim 3, wherein:

the irradiance in the output beam of the frequency-shifting means is given by $$I = 1 + A \sin(4\omega t + \phi)$$

where A is the amplitude of the sinusoidal part of the irradiance, $\omega$ is the imposed sinusoidal frequency and $\phi$ is the phase of the diffracted beam through the pinhole relative to that of the directly transmitted beam.

5. An interferometer as in claim 3, wherein:

said means for imposing a sinusoidal frequency comprises a half-wave plate rotating at an angular frequency $\omega$.

6. An interferometer as in claim 4, wherein:

said converting means converts the irradiance into phase-difference data.

7. An interferometer as in claim 6, wherein:

said converting means comprises a plurality of photodetectors, one being used as a reference photodetector and the rest as test photodetectors, the photodetectors being arranged in an array transversely to the beam direction so that each reads a different point in the transverse interference pattern presented by the output beam of the frequency-shifting means, and a plurality of phase-to-voltage converters, each receiving the output of the reference photodetector and the output of a different one of said test photodetectors and converting its inputs into an output proportional to the phase difference between the two inputs.

* * * * *